Aug. 16, 1960 J. MACHTS ET AL 2,949,311

TONE ARM FOR RECORD PLAYERS

Filed March 14, 1958 2 Sheets-Sheet 1

INVENTOR
Joachim Machts &
Werner Bonk

BY George H. Spencer
ATTORNEY

INVENTOR
Joachim Machts &
Werner Bonk
BY George H Spencer
ATTORNEY

United States Patent Office 2,949,311

Patented Aug. 16, 1960

2,949,311

TONE ARM FOR RECORD PLAYERS

Joachim Machts, Hannover-Sued, and Werner Bonk, Hannover-Linden, Germany, assignors to Telefunken G.m.b.H., Berlin, Germany Filed Mar. 14, 1958, Ser. No. 721,435

Claims priority, application Germany Mar. 30, 1957

8 Claims. (Cl. 274—23)

The present invention relates to sound reproducing apparatus and, more particularly, to record changers and the like, wherein pickup arms or tonearms are provided having retractable, suitably detachable, supporting members utilized for locating the correct contact points for the pickup stylus within the starting groove of the records, irrespective of their diameters.

Accordingly, the present invention provides a novel pickup arm structure wherein, for the purpose of determining the size of said record, the contact pressure between said pickup arm and a record is increased during a record scanning operation to a value sufficient to assure that this scanning operation is properly performed, while the aforementioned contact pressure is reduced upon insertion of the pickup stylus in the starting groove of the record, so that only slight pressure and friction is acting at the stylus point.

Although various proposals have been made for the reproduction of recorded sound from groups of phonograph records having different diameters, the phonograph pickup devices heretofore known have certain marked disadvantages impairing the fidelity of the sound reproduction.

In a known form of reproducing apparatus, a support member is provided comprising a roller which lies in a plane at an angle with respect to a tangent line taken along the groove of the record, so that by rotating the record, the latter, due to the inclination of the support member, carries the pickup arm to the record edge. However, this is only possible if the pickup arm has a certain weight. Thus, in modern pickup devices, the contact pressure is of a magnitude of the order of 8 to 10 grams and in the latest developments, these values have been reduced. For example, there has been developed a record player for use in vehicles, wherein the pickup device has a contact pressure of only 2 grams. Moreover, with contact pressures of such relatively low magnitudes, the driving force between the roller and the record surface is too small to overcome friction set up in the pickup arm bearing. As a result of this, the pickup arm will not be carried by the record but, on the contrary, remains motionless thereon with the attendant result, that improper operation of the reproducing apparatus ensues.

In another known type of reproducing apparatus, the pickup arm is not carried by the record itself as a result of the inclination of the roller, i.e., slides from the center of the record outwardly to the edge thereof under the control of a suitable motor. Although, in devices of this type, the pickup arm is positively and safely carried, it is to be noted that the weight of the pickup arm is utilized to uncouple or disengage the motor control means when the support member drops from the edge of the record. Therefore, if contact pressure is too small, the aforementioned disengagement may not occur, again resulting in improper operation of the reproducing apparatus.

Thus, with a view of obviating the aforementioned difficulties, the pickup arm of the present invention is provided with a support member which can snap into said pickup arm. This support member is placed onto the inner portion of the record surface, whereafter the support member slides outwardly towards the peripheral edge of the record, either under the control of a suitable motor or as a result of its incline with respect to the record groove tangent line, as already mentioned, thereby performing the record scanning operation for the purpose of determining the size of the record and the starting groove thereof. Subsequently, upon dropping from said record edge, the support member retracts into the pickup arm, so that a pickup needle or stylus is exposed and automatically placed into the starting groove of the record which is to be played.

It is another object of the present invention to provide means for increasing the contact pressure of the pickup device during the record scanning or feeling operation, or during at least a part of it, so that said scanning operation is carried out positively and safely in spite of the relatively small weight of the pickup device.

It is a further object of the invention to provide motor-controlled means which compensate for relief of the pickup arm weight, or at least a portion thereof, acting upon or effective at the stylus.

It is a further and important object of the invention to provide an improved light-weight pickup arm structure wherein contact pressure between the pickup arm and a record is increased during the record scanning operation to a value sufficient to assure proper functioning of said pickup arm, while the contact pressure is reduced when the pickup stylus is inserted into the starting groove of said record.

It is a still further object of the present invention to provide means reducing the effective weight of the pickup arm acting upon the stylus when the latter is inserted into a record groove, to thereby relieve pressure and friction acting on the stylus point.

It is another object of the present invention to provide means for scanning records having different diameters in a manner to ensure that a pickup stylus will be positively and effectively inserted into the starting groove of the record, irrespective of its size.

It is a further object of this invention to provide an improved motor-controlled pickup arm structure of relatively reduced weight, wherein the motor is effectively disengaged upon insertion of the pickup stylus in the starting groove of the record.

It is an additional object of the invention to provide an improved light-weight pickup arm structure which is positive in its operation, has relatively few moving parts and contributes to higher fidelity of the reproduced sound.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figures 1, 2:
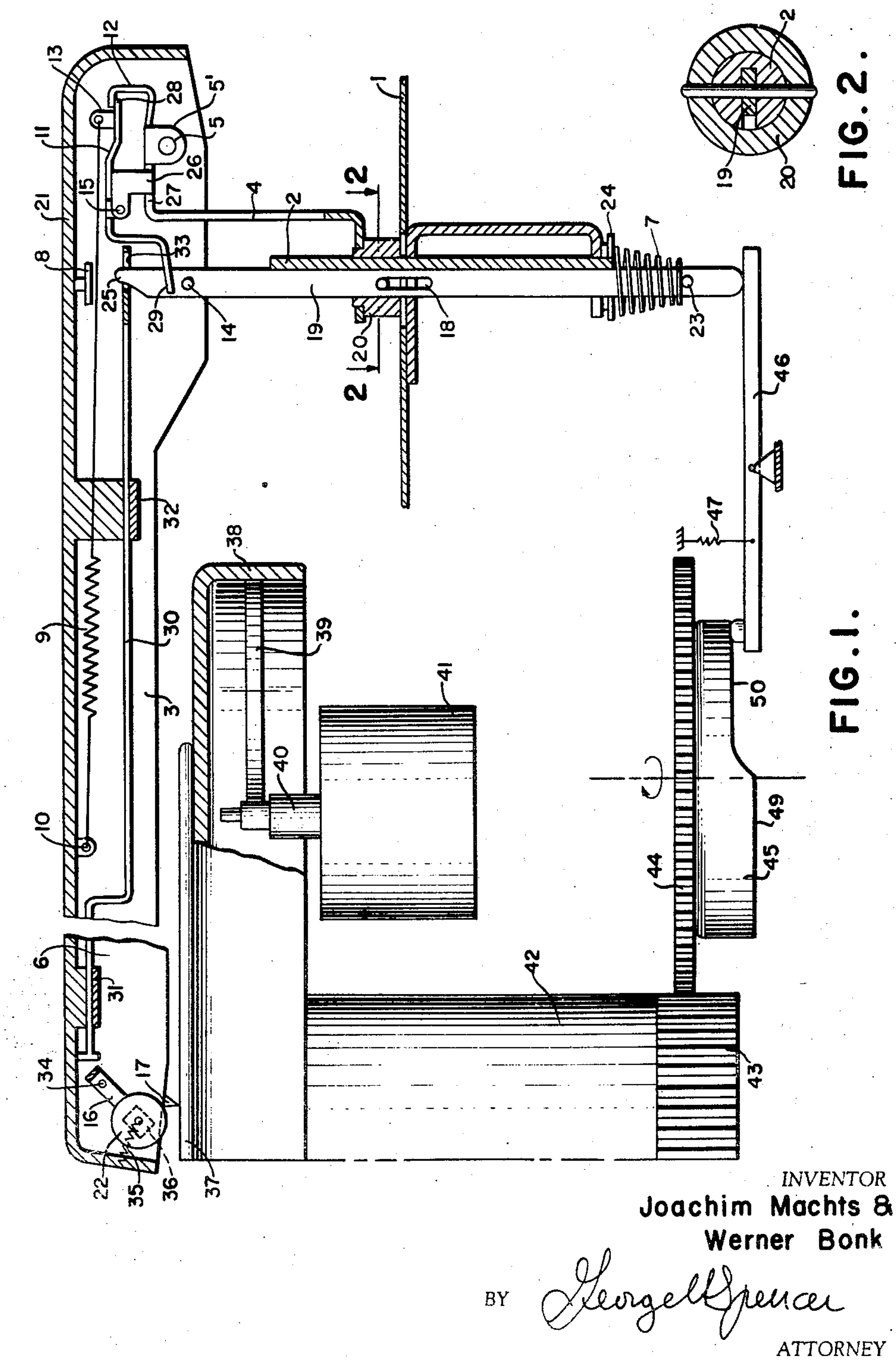
Figure 1 is a longitudinal section through a pickup arm according to the present invention.
Fig. 2 shows in an enlarged scale a cross sectional view along the line 2—2 in Fig. 1.

In Figure 1, a hollow vertically arranged shaft or spindle 2 is rotatably supported in a chassis 1 of a phonograph or reproducing apparatus and connected to a horizontal pivot 5 disposed adjacent the rear end of a pickup arm 3 by means of an angle bracket 4 having downwardly extending legs 5'. Thus, the pickup arm 3 can be displaced parallel to a record turntable (not shown) by means of the spindle 2, while the front or forward end 6 of said pickup arm supporting a pickup stylus 17 can be moved substantially perpendicular with respect to said record turntable by swinging about the horizontal pivot 5.

Within the hollow spindle 2, there is mounted a rod 19 adapted to lift the pickup arm at the appropriate time, said rod being slidable along and relative to this spindle 2 within limits defined by the length of a longitudinal slot 18 formed therein. The rod 19 is normally biased and held in its lower position, as shown in Figure 1, by a suitable resilient member or spring 7 acting on a pin 23 carried adjacent the lower end of this rod, while the opposite end of the spring 7 rests against a plate 24 on the lower end of the spindle. Adjacent the upper end of the rod 19, there is also provided a pin member 14, the purpose of which will be set forth hereinafter.

Figure 3:
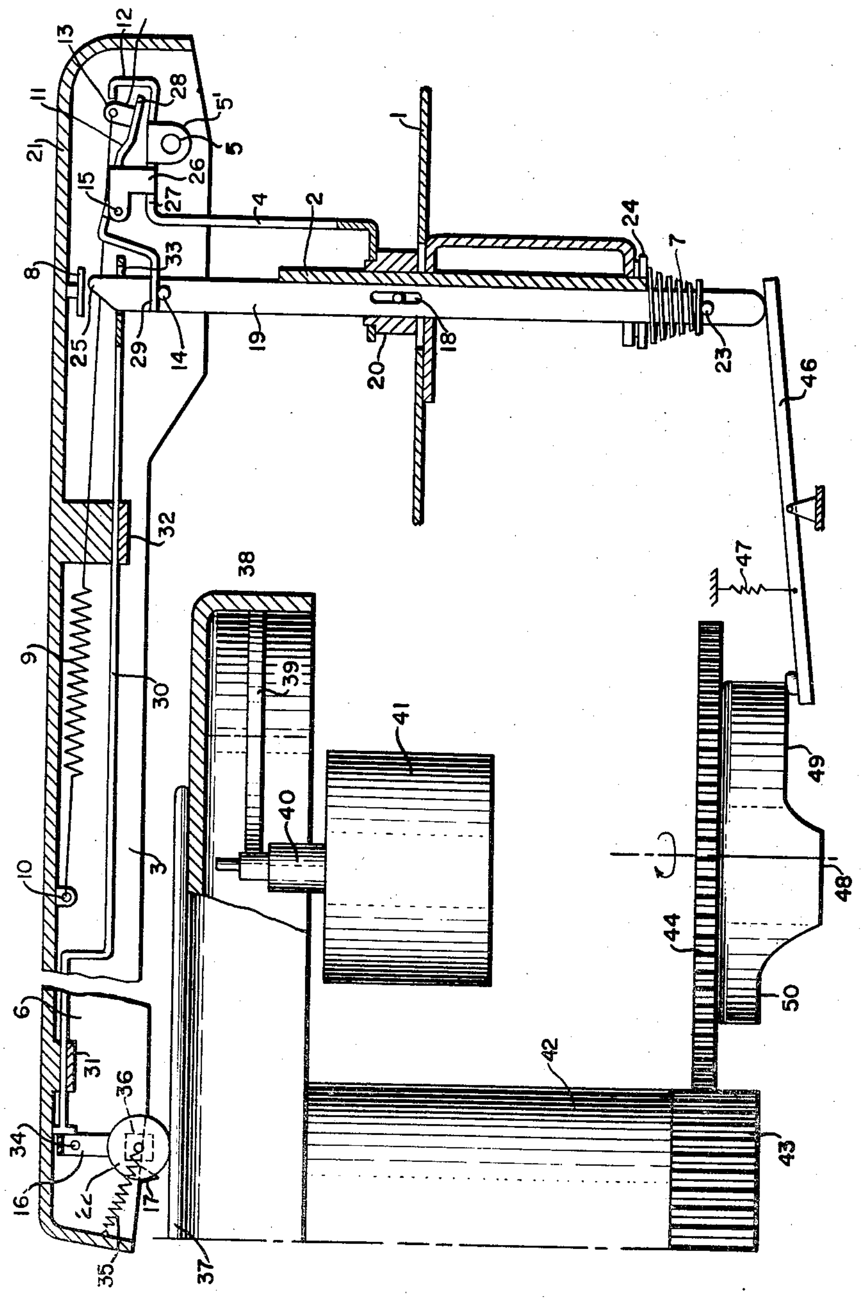
Figure 3 is a longitudinal section through the pickup arm of Figure 1 during the scanning operation.

A cam plate 45 engages the rod 19 through the intermediary of a pivotal lever 46 at its lower end and is adapted to drive it in vertical direction, so that the upper end 25 of this rod will engage a thrust plate 8 which is fixedly secured to the inner wall 21 of the pickup arm 3 and lifts the latter including the stylus 17, for example, upon termination of the playing of a record. The pivotal lever 46 is biased against a cam surface 50 by means of a spring 47. A gear 44 in registry with said cam plate 45 is engageable with the lower end of a shaft 42 which is provided with teeth or gear means 43. The upper portion of said shaft supports a turntable 38 upon which a record 37 is disposed for playing. The turntable 38 is driven by means of a motor 41 through the intermediary of a gear train 40 and an intermediate gear 39, the latter being arranged, in a manner known per se, for vertical displacement to provide different speed changes by being selectively engageable with the different size gears of the gear train 40. In the front portion 6 of the pickup arm 3 and adjacent the stylus 17, there is provided in a conventional manner a support member in the form of roller 22 adapted to scan or feel the record size, said roller projecting beyond the stylus 17 during the aforementioned record scanning operation, and being retractable or snapping into the pickup arm to an extent sufficient to expose the frontal portion of the stylus 17 when the scanned record is played. The movement of the supporting member into, or out of, the pickup arm may be caused in any suitable manner, for example as shown in Fig. 1 by means of the rod 19. When moving upward, the upper inclined end of rod 19 engages the left wall of an aperture 33 within a longitudinally arranged push rod 30 which is slidably mounted in bearings 31 and 32 provided in the pickup arm 3. Thus the push rod 30 is moved to the left, causing a member 16 which carries the roller 22 to turn counter-clockwise around its pivot 34 against the force of a spring 35, so that the roller 22 will project beyond the stylus 17. Figure 3 illustrates the position of the tone arm 3 when the roller 22 scans the diameter of the record. The gear 44 is then brought into engagement with the gear 43. When the lever 46 has moved from the cam portion 50 to the cam portion 48 of the cam plate 45, upon completion of the playing of the record, the rod 19 is lifted to such an extent that its upper end engages the thrust plate 8 secured to the pick-up arm and lifts the same so that it no longer engages the record. At the same time, the rod 19 has shifted the push rod 30 towards the left, whereby the roller 22 is turned to project beyond the stylus 17, as previously detailed. After the pickup arm has been turned radially outwardly and again inwardly to permit positioning of a new record, in a manner known per se, the pivotal lever 46 will engage the cam portion 49 of the cam plate 45, as shown in Figure 3, and the roller 22 engages the record 37 to scan the diameter thereof. In this partially lowered position of the tone arm 3, the free end 29 of a leaf spring 11 remains in the position shown in Figure 3, due to its abutting with a pin 14 mounted on the rod 19, whereby the bearing pressure is increased by decreasing the distance between the horizontal pivot 5 and the point 13 of a relief spring 9, as will be more fully explained below.

At the end of the scanning operation, that means after the roller has fallen down from the record edge, the rod 19 moves downward, thereby releasing the member 16 which can now turn in clockwise direction due to the spring 35. The cycling mechanism must be related to the time necessary for scanning the largest record to be played, and the roller cannot be retracted at once after scanning a record with a smaller diameter, since the rod will then still be in its upper position. In order to prevent in the case of a small record either that the pickup arm moves further outward or that the stylus comes into engagement with the initial groove before the roller is retracted, there is provided an auxiliary supporting member 36 behind the roller. Thus, after the roller has fallen down from the record, said member 36 will rest on the edge of the record to be played until the rod 19 allows the roller to be retracted.

In order to relieve the stylus 17 from the effective weight of the pickup arm 3, or at least a portion of this weight, the relief spring 9 is provided which is suspended and stretched between a point 10 adjacent the front portion 6 of the pickup arm 3 and one end, i.e., point 13, of the pivotal member 11 which is in the form of a leaf spring. This pivotal member 11 is pivotally secured at 15 to substantially L-shaped legs 26 extending upwardly from a horizontal member 27 forming a part of the angle bracket 4. The rearward end 28 of said leaf spring 11 supporting one end of the relief spring 9 at the point 13 abuts the end of a substantially U-shaped lug 12 formed on the angle bracket 4. The opposite or free end 29 of this leaf spring 9 overlies a pin 14 and is situated in the path of movement of the rod 19 for the purpose which will be described hereinafter. Thus, with the point of application 10 assumed to be fixed, the amount of relief of contact pressure or pickup arm weight accorded to the stylus is then determined by the distance between the point 13 on the pivotal member 11 to which one end of the relief spring 9 is attached and the horizontal pivots 5. Accordingly, the greater this distance, the greater the relief of pickup arm weight acting upon the stylus 17.

Heretofore, it has been proposed to adjust the contact pressure manually before starting operation of the reproducing apparatus by varying the aforementioned distance by means of a spindle or the like and adjusting it to a predetermined or specified value. In contradistinction, and according to the present invention, such adjustment is automatically obtained during the scanning step of the record to determined its size, so that when the rod 19 is moving upwardly, the pin 14 carried therewith acts on the free end 29 of the leaf spring 11 and causes the same to swing about its pivot at 15 in such a manner, that the distance between the point 13 and the pivot at 5 is decreased with the result that the aforementioned relief of the pickup arm weight is partly eliminated and, moreover, the contact pressure is increased.

The operation of the device is such that, when a record has been played, the rod 19 is lifted by the then clutched record-changing mechanism (not shown) and, in turn, lifts the pickup arm 3 upon contact with the thrust plate 8. Furthermore, the pin 14 engages the free end 29 of the leaf spring 11 and causes the latter to swing clockwise about its pivot 15, so as to increase the contact pressure due to the displacement of the point 13 towards the pivot 5. The pickup arm then moves outwardly away from the record edge, so that the next record to be played can drop onto the turntable. Thereafter, the pickup arm again moves inwardly and engages the dropped record with its roller 22 which, in the meantime, has snapped out beyond the outer extremity of the stylus 17.

At this instant, the rod 19 has moved downwardly from the thrust plate 8 a small distance, so that the rod no longer engages this plate. Consequently, contact pressure still remains high, while the record is being scanned and its size determined. Thus, only when the pickup stylus 17 enters the first or starting groove of the record will the rod 19 resume the position shown in Figure 1 of the drawing, so that relief of the pickup arm weight acting upon the stylus 17 is again wholly effective.

As a result of the increase in contact pressure during the automatic record scanning operation, as described in the foregoing, the pickup arm 3 is safely and positively carried and, furthermore, in the case of a motor-controlled scanning process, disengagement of the motor control device at the proper time is assured. In the latter case, it would be sufficient to increase the contact pressure only during the time at which said control device is being disconnected.

In order to adjust the contact pressure for playback operation, the point of application 10, to which the forward end of relief spring 9 is secured, can be provided displaceably or adjustably.

We claim:

1. In a device for reproducing a signal from a grooved record having a starting groove; the combination of a displaceable light-weight pickup arm, a stylus supported adjacent one end of said pickup arm, a support member carried by said pickup arm and disposed adjacent said stylus, means in registry with said support member for moving the same relative to said stylus so as to extend either rearwardly of said stylus or forwardly beyond said stylus in an advanced position, whereby movement of said pickup arm across said record causes scanning of the latter by means of said advanced support member contacting said record so as to determine the size of said record and to locate the starting groove thereof, and means in registry with said pickup arm for increasing contact pressure between said pickup arm and said record during the scanning operation, said support member upon reaching the peripheral edge of said record retracting inwardly, thereby freeing said stylus for insertion of the same into the starting groove of said record.

2. In a device according to claim 1, said means for increasing contact pressure between said pickup arm and said record including a displaceable rod member disposed below said pickup arm, a pivotal member located adjacent one end of said rod member and arranged for rotational movement upon contact with said rod member during dipslacement of the latter in one direction, resilient means suspended between said pickup arm and said pivotal member, whereby displacement of said rod member in said one direction imparts said rotational movement to said pivotal member to increase said contact pressure between said pickup arm and said record.

3. In a device for reproducing a signal from a grooved record having a starting groove; the combination of a displaceable light-weight pickup arm, a stylus supported adjacent one end of said pickup arm, a support member carried by said pickup arm and disposed adjacent said stylus, means in registry with said support member for moving the same relative to said stylus so as to extend either rearwardly of said stylus or forwardly beyond said stylus in an advanced position, whereby movement of said pickup arm across said record causes scanning of the latter by means of said advanced support member contacting said record so as to determine the size of said record and to locate the starting groove thereof, and means in registry with said pickup arm for increasing contact pressure between said pickup arm and said record during the scanning operation, said support member upon reaching the peripheral edge of said record retracts inwardly, thereby freeing said stylus for insertion of the same into the starting groove of said record, said means for increasing said contact pressure including a displaceable rod member disposed below said pickup arm, a pivotal member located adjacent one end of said rod member and arranged for rotational movement upon contact with said rod member during displacement of the latter in one direction, resilient means suspended between said pickup arm and said pivotal member, whereby displacement of said rod member in said one direction imparts said rotational movement to said pivotal member to increase said contact pressure, said rod member during displacement in said one direction coming into registry with said pickup arm to move the latter together with said stylus away from said grooved record, spring means for biasing said rod member in an opposite direction from said one direction, so that movement of said rod member in said opposite direction reduces at least partially said contact pressure during reproduction of said signal from said grooved record.

4. In a device for reproducing a signal from grooved records of different diameters each having a starting groove; the combination of a movable light-weight pickup arm, a stylus having a forward end and supported adjacent one end of said pickup arm, a support member carried by said pickup arm at a predetermined inclination with respect to a record groove tangent line and situated adjacent said stylus, means in registry with said support member to displace the same inwardly or outwardly relative to the forward end of said stylus so that said support member in an advanced position extends beyond said forward end of said stylus, whereby movement of said pickup arm due to said inclination of said support member across said records from its center towards its peripheral edge causes scanning of said records by means of said advanced support member in order to determine the size of the diameter of said records and to locate the starting grooves thereof, and means in registry with said pickup arm for increasing contact pressure between said pickup arm and said records during the scanning operation, said support member upon reaching said peripheral edge of said records retracting inwardly relative to the forward end of said stylus, thereby freeing said stylus for insertion into said starting grooves.

5. In a reproducing apparatus for reproducing a signal from grooved records of different sizes, each of which having a starting groove; the combination of a motor-actuated, light-weight pickup arm, a pickup stylus having a free end constructed for insertion into the starting grooves of said respective records and supported adjacent one end of said pickup arm, a support member carried by said pickup arm and disposed adjacent said pickup stylus, means in registry with said support member to displace the same relative to said stylus so as to extend either rearwardly of said stylus or else forwardly beyond said free end of said stylus in an advanced position, whereby movement of said motor-actuated pickup arm across said records causes scanning of the latter by said advanced support member contacting said record in order to determine the size of said records and to locate the starting grooves thereof, said support member upon reaching the edge of said records retreating inwardly towards said pickup arm, thereby exposing the free end of said pickup stylus for insertion into the starting groove of said record, and means in registry with said pickup arm for increasing the contact pressure between said pickup arm and said records at least during the instant of disengagement of the motor of said pickup arm.

6. The combination of a phonograph pickup arm, a pickup stylus carried at one end of said pickup arm, a support member disposed adjacent said pickup stylus and supported by said pickup arm, a hollow rotatable spindle disposed below said pickup arm, a spring-biased rod member in registry with said support member located within said hollow spindle and displaceable along its longitudinal axis relative to said spindle, means interconnecting said hollow spindle and the other end of said pickup arm to permit movement of said pickup arm both angularly and parallel to a grooved record surface, a member pivotally supported by said means and having one end lying in the path of movement of said displaceable rod member, resilient means suspended between said one end of said pickup arm and said pivotal member, whereby movement of said displaceable rod member in one direction causes rotation of said pivotal member in one position in which the contact pressure between said pickup arm and said record is increased and said support member is advanced forwardly of said pickup stylus and is adapted to support said pickup arm during its travel across said record, while said pivotal member in another position relieves said contact pressure between said pickup arm and said record upon contact of said pickup stylus with said grooved record surface.

7. The combination as set forth in claim 6, said means being defined by an angle bracket pivotally connected to said pickup arm to permit said angular movement of said pickup arm relative to said record surface, said angle bracket including a member engaging said pivotal member when said rod member is not in contact with said pivotal member.

8. The combination of a phonograph pickup arm having a forward and rearward portion, a pickup stylus supported by said forward portion of said pickup arm, a detachably secured support member disposed adjacent said pickup stylus and carried by said pickup arm, a hollow rotatable spindle disposed below said pickup arm, a spring-biased rod member in registry with said support member located within said hollow spindle and displaceable along its longitudinal axis relative to said spindle, angle bracket means interconnecting said hollow spindle and said pickup arm and pivotally secured to said rearward portion of said pickup arm to permit movement of said pickup arm both angularly and parallel to a grooved record surface, a pivotal member having a free end and supported by said angle bracket, said free end lying in the path of movement of said displaceable rod member, resilient means suspended between said forward portion of said pickup arm and the opposite end of said pivotal member remote from said free end, whereby movement of said displaceable rod member in one direction causes rotation of said pivotal member so that said opposite end of said pivotal member together with said resilient means carried thereby approaches the pivot of said pickup arm, whereby the contact pressure between said pickup arm and said record is increased and said support member is advanced forwardly of said pickup stylus and is adapted to support said pickup arm during its travel across said record.

References Cited in the file of this patent

UNITED STATES PATENTS

| | | |
|---|---|---|
| 2,778,646 | Hironimus | Jan. 22, 1957 |

FOREIGN PATENTS

| | | |
|---|---|---|
| 554,282 | Great Britain | June 28, 1943 |
| 778,979 | Great Britain | July 17, 1957 |